(12) United States Patent
DeMeuse

(10) Patent No.: US 6,410,136 B1
(45) Date of Patent: Jun. 25, 2002

(54) POLYOLEFIN FILMS SUITABLE FOR INSTITUTIONAL APPLICATIONS

(75) Inventor: Mark Thomas DeMeuse, New Castle County, DE (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 0 days.

(21) Appl. No.: 09/442,178

(22) Filed: Nov. 16, 1999

(51) Int. Cl.7 .................. B32B 27/32; C08F 23/04
(52) U.S. Cl. ............... 428/347; 428/523; 428/910; 428/352; 525/240
(58) Field of Search ............... 525/240; 428/910, 428/523, 515, 516, 347, 349, 352

(56) References Cited

U.S. PATENT DOCUMENTS

| | | | | |
|---|---|---|---|---|
| 4,354,004 A | * | 10/1982 | Hughes et al. | 525/240 |
| 4,842,875 A | | 6/1989 | Anderson | 426/118 |
| 5,147,936 A | * | 9/1992 | Peszkin et al. | 525/240 |
| 5,266,392 A | * | 11/1993 | Land et al. | 428/224 |
| 5,358,792 A | * | 10/1994 | Mehta et al. | 428/516 |
| 6,232,402 B1 | * | 5/2001 | De Meuse | 525/191 |

FOREIGN PATENT DOCUMENTS

| | | |
|---|---|---|
| WO | WO 96/07699 | 3/1996 |
| WO | WO 97/11846 | 4/1997 |
| WO | WO 98/37139 | 8/1998 |

OTHER PUBLICATIONS

Encyclopedia of Polymer Science and Engineering, "Ethylene Polymers", vol. 6, pp 386–387, 1985.*
Database WPI, Section Ch. Week 199444 Derwent Publications Ltd., London, GB; XP002155640 & JP 06 278776 A (Toyobo KK), Oct. 4, 1994.

* cited by examiner

Primary Examiner—D. Lawrence
(74) Attorney, Agent, or Firm—Caesar, Rivise, Bernstein, Cohen & Pokotilow, Ltd.

(57) ABSTRACT

Polyolefin films having high oxygen transmission values are composed of blends of more than about 10% by weight to about 60% by weight of isotactic polypropylene, about 10% by weight to about 25% by weight of low density polyethylene and about 15% by weight to less than about 80% by weight of an olefin heteropolymer containing propylene and at least one other α-olefin of 2 to 4 carbon atoms having a melting point less than that of polypropylene and a density of no greater than about 0.95 g/cc.

15 Claims, No Drawings

POLYOLEFIN FILMS SUITABLE FOR INSTITUTIONAL APPLICATIONS

FIELD OF THE INVENTION

This invention relates to polyolefin films having certain unique properties. Specifically, it relates to essentially clear polyolefin films based on polyethylene and polypropylene that exhibit an increased oxygen transmission property as compared to conventional polypropylene films known to the art, while achieving desired stiffness and optical properties to render such films highly suitable for use in the institutional packaging of perishable items, e.g., fresh fruits, vegetables and flowers.

BACKGROUND INFORMATION

It is known that, for many applications, particularly packaging applications, that polypropylene is less than totally satisfactory due to a relatively high permeability to oxygen. Typically, a 0.7 mil (70 gauge) biaxially oriented film of polypropylene exhibits an oxygen transmission rate (OTR) of about 125 cc/100 sq. in./day/atmosphere. Such an OTR is too great for such applications as packaging of potato chips, most chocolate candy, processed meats and cheeses and other packaging applications where an excess of oxygen can lead to premature spoilage of the packaged product.

A great amount of effort has been expended in recent years to decrease the oxygen transmission characteristics of polypropylene. The best results to date have been obtained by metallization of the films.

There are, however, some applications in which a greater and controllable oxygen transmission rate is desired. This is particularly the case when fresh fruits, vegetables and flowers are to be packaged, as these products continue to respire after they are packaged. Absence or insufficient levels of oxygen, which occurs as the oxygen initially present in the package is consumed, leads to premature senescence and spoilage of the products. At the same time, respiration leads to a build-up of moisture in the package, which can also lead to spoilage of the product if the moisture cannot escape from the package. It is thus desirable to provide polypropylene packaging wherein the oxygen content can be replenished as necessary and from which the moisture can escape.

Conventional polypropylene films of a thickness required for most applications, whether monolayer or composite, have oxygen and moisture vapor permeability values that are not sufficient to allow the optimum oxygen and moisture levels to be maintained in a sealed package containing products of the type mentioned. This is the case for both conventional consumer packages and for industrial packaging applications.

It is known to prepare microporous films based on an opaque polymer mixture comprised of about 45% to 55% of a polypropylene homopolymer and 55% to 45% of a copolymer of propylene and ethylene containing about 2% to 5% ethylene by weight, which films have greater oxygen permeability than films made of plain polypropylene. This polymer mixture is blended into a mixture comprised of about 40 to 60% of the polymer mixture and 60 to 40% of certain inorganic filler materials and is subjected to biaxial orientation. Anderson, U.S. Pat. No. 4,842,875, teaches the use of such films in the preparation of controlled atmosphere containers for use with fresh vegetables, fruits and flowers.

Microporous films known to the art as described above function reasonably well for preparing films having increased and, to a degree, controllable oxygen and moisture vapor permeability. However, the voiding pigments employed in the prior art are of a particle size large enough and are employed in concentrations great enough to result in the formation of voids of such a size that the resultant films are almost totally opaque.

It is also known to prepare polyolefin films of high oxygen transmission rate for some applications by laminating a polyethylene film of about one mil thickness to a polypropylene film of about 0.4 to 0.5 mil thickness. The polypropylene film acts as a stiffener to give the polyethylene sufficient stiffness that it can be used as a produce wrapper. The polyethylene, which has an inherently high OTR, then acts as a high OTR sealant layer.

In work leading to this invention, it has been found that, by blending low density polyethylene and polypropylene within specific blending ratios, a film can be prepared that has a sufficiently high oxygen transmission rate (OTR) for use in packaging fresh fruits, flowers and vegetables that require a continuous replenishment of the oxygen supply in the closed package. Films having the desired properties for non-institutional, retail applications can be prepared from blends consisting essentially of about 61 to 85% by weight of isotactic polypropylene and 39 to 15% by weight of low density polyethylene. Such films also exhibit a sufficiently great stiffness to permit their use in such applications.

Films prepared with the blends just described, when cast and drawn to a typical packaging film thickness, i.e. 0.7 to 0.8 mil (70 to 80 gauge), exhibit several properties that make them desirable for the non-institutional, retail packaging of fresh produce items. They are of a stiffness required of packaging materials generally, i.e. a tensile modulus sufficient to allow the films to be handled in conventional film conversion equipment. In addition, such films exhibit an OTR greater than 200 cc/100 sq. in./day/atmosphere; a level at which the packaged product can continue to respire for a reasonable time after it has been harvested, thus assuring a reasonable shelf life for the product in non-institutional, retail markets.

While films prepared with a blend of polypropylene and low density polyethylene in the ratios set forth above exhibit the OTR and stiffness required for non-institutional retail applications, they are not so clear and haze-free as is desired for prepackaging of produce for such retail applications. For retail consumer applications, a clear film is required in order to display the product most attractively to the shopper in, e.g. a supermarket display or the like. A clear film required for consumer applications is defined as one having a haze value less than about 4% as determined by the Gardner Haze Meter.

It should be noted that for non-institutional retail applications both a high degree of stiffness and clarity of the packaging film are important attributes, since these latter properties are perceived by the consumer as being an indication of the freshness of the packaged item, i.e., a limp, hazy or opaque film conveys a negative visual image to the consumer.

It has been determined that a film having the desired oxygen transmission rate (OTR) required for the non-institutional retail packaging of fresh produce items and similar products, which also have the desired stiffness and clarity properties can be formed with blends of polypropylene and low density polyethylene, which films also contain an olefin heteropolymer containing propylene and at least one other α-monoolefin. The specified weight percentages of the polypropylene, low density polyethylene and olefin heteropolymer are described and claimed in a co-pending application of Mark Thomas DeMeuse filed on Oct. 28, 1999 Ser. No. 09/427,765 and entitled Films Based on Three Component Polyolefin Blend. The subject matter of this latter application is fully incorporated by reference herein.

It should be noted that for non-institutional retail applications, the packaging films for produce and similar products are required to have an OTR of at least 200 cc/100 sq. in./day/atmosphere, a modulus of at least about 195,000 PSI, and more preferable at least 200,000 PSI, and a haze value no greater than about 4%.

While the three component polyolefin blend described and claimed in the aforementioned co-pending application meets the desired requirements for films for packaging fresh produce items in the non-institutional retail market, these latter films do not have the required OTR values necessary for institutional applications, e.g., the large-quantity packaging of produce and similar items for sale to institutions such as restaurants and hospitals. Moreover, since institutional packages generally are opened by institutional employees to either serve or use the packaged items, the consumer of the product normally does not view the package. Thus, institutional packaging films are not required to be as stiff, i.e., have as high a modulus, or as clear as non-institutional retail packages, since the consumer's perception of freshness created by a high stiffness, high clarity package does not need to be communicated to the same degree to institutional buyers. However, it is still very desirable to employ packaging films for the institutional market that have a reasonable degree of stiffness and that are not excessively hazy or opaque. Applicant has determined that for institutional applications, clarity and stiffness can be sacrificed to some degree in order to obtain the desired OTR values.

The primary property requirement for the institutional market is an OTR value of at least 325 cc/100 sq. in/day/atmosphere at a film thickness of about 70–80 gauge. Moreover, the film optical and tensile properties desirably need to be better than films of linear low-density polyethylene (LLDPE), the material presently primarily used for these industrial applications. Typical prior art films formed of LLDPE have haze values in the range of 6–20% and a typical tensile modulus value of about 25,000 psi. However, films for the institutional packaging of fresh fruits, vegetables and flowers desirably should have a haze value no greater than about 10%, more preferably less than 8% and a tensile modulus greater than 80,000 psi, and preferably no less than about 100,000 psi, while at the same time maintaining an OTR value of at least 325. It is to such an institutional packaging film that the present invention relates.

It is an object of the invention to provide polyolefin films based on polypropylene and low density polyethylene that have the properties required to be useful in modified atmosphere packaging applications for packaging fresh vegetables, fruits, flowers and similar items for institutional applications.

SUMMARY OF THE INVENTION

In accordance with this invention, there are provided films having the desired higher oxygen transmission rate (OTR) required for the institutional packaging of fresh produce and similar items, said films being prepared with blends of polypropylene and low density polyethylene, which films also contain an olefin heteropolymer including propylene and at least one other α-monoolefin.

In accordance with this invention a biaxially oriented film is comprised of a polyolefin mixture consisting essentially of a) more than about 10% by weight to about 60% by weight of isotactic polypropylene;

b) about 10% by weight to about 25% by weight of low density polyethylene having a density less than about 0.935 g/cc; and c) about 15% by weight to less than about 80% by weight of an olefin heteropolymer containing propylene and at least one other α-olefin of 2 to 4 carbon atoms, said heteropolymer having a melting point less than that of polypropylene and a density no greater than about 0.95 g/cc.

In accordance with a more preferred embodiment of this invention, the polyolefin mixture consists essentially of (a) about 20% by weight to about 45% by weight of isotactic polypropylene;

(b) about 10% by weight to about 25% by weight low density polyethylene having a density less than about 0.935 g/cc; and (c) about 30% by weight to about 70% by weight of an olefin heteropolymer containing propylene and at least one other α-olefin of 2 to 4 carbon atoms, said heteropolymer having a melting point less than that of polypropylene and a density no greater than about 0.95 g/cc Films prepared with polymer compositions within the specified limits of this invention are found to have properties that meet specifications for commercial, institutional use in the packaging of fresh fruits, vegetables and flowers. Specifically, these films exhibit an OTR of at least 325 cc/100 sq. in./day/atmosphere, a modulus greater than 80,000 psi and preferably no less than about 100,000 psi and a haze value no greater than about 10% and more preferably less than 8%.

DESCRIPTION OF THE BEST MODE OF THE INVENTION

In the following discussion, gas permeability properties of the films of the invention will be discussed in terms of their OTR. Carbon dioxide transmission rate is also an important parameter of these films affecting their utility as packaging materials for fresh produce items since carbon dioxide is also generated as the product continues to respire. Carbon dioxide transmission rates can be estimated using the generally accepted factor of a weight ratio of carbon dioxide to oxygen transmitted per unit of time of about 4 to 1.

The term "α-monoolefin", as used herein, refers to a linear hydrocarbon having one carbon-carbon double bond, which double bond is located at the end of the linear chain. The term is intended to include any such monomer having 6 carbon atoms or less, including ethylene and propylene.

When used in this disclosure, the term "low density polyethylene" is intended to indicate a polyethylene species having a density less than about 0.935 g/cc and preferably between about 0.915g/cc and 0.935 g/cc. By contrast, high density polyethylene, widely used in the film art for preparing polyethylene film, has a density on the order of 0.95–0.97 g/cc.

Low density polyethylenes are known, commercially available materials. Typical of commercially known low density polyethylenes are Chevron 1017 (Chevron Chemicals, Houston, Tex.), Exxon Exact 3132 (Exxon Chemicals, Houston, Tex.), and Petrothene NA321 (Quantum Chemical, Chicago, Ill.), These polymers can be ethylene homopolymers or they can be copolymers of ethylene with a linear α-monoolefin having 4 to 8 carbon atoms in which the ethylene predominates. Such copolymers are also referred to in the art as low density polyethylenes.

The term "heteropolymer" is intended to mean an olefin polymer containing propylene and at least one other a-monoolefin. The materials found useful in the practice of this invention have melting points lower than that of polypropylene and a density no greater than about 0.95 g/cc and preferably between 0.91 and 0.95 g/cc.

Typical of such heteropolymers are ethylene-propylene copolymers having about 4.5 to 6% by weight of ethylene, butene-propylene copolymers containing about 5 to 34% by weight of butene-1 and ethylene-propylene-butene-1 terpolymers. Such heteropolymers as those described are well known in the polyolefin art and are widely used as heat seal layers on commercial polypropylene composite films. In those applications, the heteropolymers comprise very thin layers on the surface of a relatively thick polypropylene core. Exemplary commercially available heteropolymers that can be employed in the practice of the invention include Fina 8573, Fina Z9470 (Fina Chemical Co. Houston Tex.) and Sumitomo SP88E5 (Sumitomo Chemical Company, Tokyo, Japan).

As pointed out above, while low density polyethylene alone blended with polypropylene produces an oriented film having the useful oxygen and moisture vapor transmission required for non-institutional, retail applications, those films are not as clear, or haze-free as some users prefer. Moreover, in order to achieve the required OTR for the institutional market (i.e., greater than 325) these latter films have an excessively high, undesirable haze value. For example, a 70 gauge film including 60% polypropylene and 40% low density polyethylene, while having an acceptable OTR of 393.3, had a haze value in excess of 45%, which is well above the desired haze value for such films. It also should be noted that a 70 gauge film including 75% polypropylene and 25% low density polyethylene had both an unacceptable OTR of 282.3 and a haze value of 10.6%. Moreover, the addition of an olefin heteropolymer containing propylene and at least one other α-monoolefin of two or more carbon atoms in the weight percentages specified in the aforementioned co-pending application of Mark Thomas DeMeuse, the subject matter of which already has been incorporated by reference herein, while providing excellent optical properties, still results in a film that does not have the required high OTR values for institutional applications.

Any isotactic polypropylene can be employed in the manufacture of films according to this invention. However, it is preferred to use one of the newer, high modulus species of polypropylene. References to high modulus polypropylene are intended to mean a polypropylene or a polypropylene composition, a film of which has a modulus greater than that of a conventional propylene homopolymer film of the same thickness drawn to the same draw ratio using the same drawing technique, i.e. bubble or tenter. For example, the modulus of a 70 gauge (0.7mil thickness) film of conventional polypropylene, drawn 7× by 7× on simultaneous draw equipment is on the order of 400,000 psi. The modulus of a high modulus polypropylene of the same thickness, similarly drawn, is at least about 450,000 psi.

Suitable and preferred polypropylenes, which exhibit the required high modulus characteristics for use in the blends, include the newly developed high crystallinity polypropylene. This material, available under several trade names, is defined as having an isotactic index of at least 93%, and preferably at least about 95%, i.e., the polymer contains no more than about 7%, and preferably no more than about 2 to 5% xylene soluble materials. Typical high crystallinity polypropylene is further characterized by higher stiffness, greater surface hardness, lower heat deflection at high temperatures, lower heat shrinkage and better creep properties than conventional isotactic polypropylenes, which have isotactic index generally less than 93%. Typical high crystallinity polypropylenes that can be employed include ACCPRO 9117, ACCPRO 9119 and ACCPRO 9218 (all available from Amoco Polymers, Alpharetta, Ga.), and also Chisso HP 5010 and Chisso XF 2805 (Chisso Chemical Co. Ltd., Tokyo, Japan and Aristech FFO35C (Aristech Chemical Co. Pittsburgh, Pa.).

Another polypropylene composition having the high modulus required for use in the blends employed in this invention can be prepared by blending conventional commercial isotactic polypropylene prepared via Ziegler-Natta catalysis with an isotactic polypropylene prepared by use of a metallocene catalyst. Such blends and films prepared therewith are described in copending and commonly assigned U.S. patent application Ser. No. 09/055,389, filed Apr. 6, 1998. In the referenced application, it is shown that very significant increases in tensile modulus are realized when these polymer types are blended. Such modulus improvements are realized with blends containing 10 to 90% of the Ziegler-Natta polymer.

Another species of high modulus polypropylene that can be employed in the films of the invention is nucleated polypropylene. These are conventional polypropylenes that have been nucleated to increase their crystallinity level and which exhibit higher modulus as a result. An example of a nucleated polypropylene is Aristech FF035C (Aristech Chemical Co., Pittsburgh, Pa.).

Film forming and drawing to effect biaxial orientation can be carried out by conventional techniques, i.e. the well known tubular (bubble) process or the equally well known tenter process can be employed. When the films are prepared by the tubular process, the draw is effected simultaneously and uniformly in the machine and cross directions to about 3× to 7× and preferably about 5× to 7×. Using the tenter process, drawing is carried out sequentially to about 3× to 7× in the machine direction and to about 7× to 11× in the cross direction.

Films according to the invention that exhibit the high OTR and MVTR characteristic can be either monolayer or composite films wherein the polypropylene/low density polyethylene/heteropolymer blend is a core layer having a functional skin layer on either or both of its surfaces. Skin layers must have OTR and MVTR at least as great, and preferably greater than that of the blended core. In either the monolayer or composite embodiment, the films are generally of a thickness from about 0.5 to 1.0 mil and preferably from about 0.5 to 0.8 mil.

Functional layers that can be employed as the skin layer include such layers as, e.g, a heat seal layer. Such a layer will be of a material of lower melting point than the core so that when heat is applied to effect the seal, the orientation of the core layer will not be disturbed. A commonly used heat seal layer is a terpolymer of propylene, ethylene and butene-1. In general, any of the heteropolymers that are useable in the core layer can be used as sealant layers. Other polymers that can be employed as a heat seal layer include polyvinyl and polyvinylidene chloride.

Another commonly used functional layer is a slip layer to facilitate handling of the film during later converting operations. Such a layer is comprised of a polymer containing a slip agent such as a high molecular weight fatty acid amide. A functional layer may also contain an antiblock additive to facilitate unwinding of the film after it has been wound at the terminus of the film manufacturing process.

To improve processability, from about 0.1 to 1% by weight, and preferably about 0.2 to 0.5% by weight, of an organic or inorganic antiblocking agent can be added to the top layer or layers. Suitable antiblocking agents are, e.g., incompatible organic polymers such as polyamides, polyesters, polycarbonates and the like or inorganic substances such as silicon dioxide and silicates. These materials are generally placed in the skin layer or layers of the film.

Typical slip agents are fatty acids or fatty acid amides. They can generally be classified as either primary amides, secondary amides or secondary bis-amides. Examples of primary amides include stearamide, oleamide and erucamide. Exemplary secondary amides that can be used include oleyl palmitamide and stearyl erucamide. Secondary bis-amides are ethylene bis-stearamide and ethylene bis-oleamide. The amides are usually used at concentration levels of 0.3% by weight or less. They may be contained in either the skin layer or the core layer.

The films according to the invention, in either the monolayer or the composite embodiment can also be provided with a cold seal coating. Such a coating is typically a rubber adhesive applied to the polymer surface.

The film surfaces can also be treated with an oxidative medium to create polar sites on the surfaces thereof and thus make the surfaces printable. A preferred oxidative medium is corona discharge. Another preferred oxidative technique is flame treatment. Another, but less preferred technique is the use of an oxidizing acid. One skilled in the film art can readily determine the best treatment technique to use and the degree of oxidative treatment required for a particular application.

Preparing Polyolefin Blends for Filming

In the examples that follow, pellets of the desired polypropylene, low density polyethylene and heteropolymer were dry mixed in the desired ratios and melt blended in a Leistritz twin screw extruder (American Leistritz Extruder Corporation, Somerville, N.J.). Strands of the blended polymer mass were extruded into a water bath at room temperature to quench the molten polymer and the quenched strands were chopped into pellets.

EXAMPLE 1

A series of polymer blends containing isotactic polypropylene, low density polyethylene and an olefin heteropolymer were prepared as indicated above. The polypropylene employed was Aristech FF035C, the low density polyethylene was Chevron 1017 LDPE, (density 0.917 g/cc) and the heteropolymer was Fina 8573,(Fina Chemical Co. Houston Tex.) a copolymer of ethylene and propylene containing 4.5% ethylene. This copolymer has a melting point of about 134° C. and a melt flow rate of 6.8 g/10 minutes and a density of about 0.895.

Films were extruded through a single layer casting die onto a casting roll maintained at between about 75 and 80° C. at a casting speed of about 3.1 feet per minute.

All of the cast films were drawn 6x by 6x on a T. M. Long Stretcher (T. M. Long Corporation, Somerville, N.J.) at a temperature of 135° C. after a 25 second preheat. These films were found to have the desired high OTR, clarity and modulus for institutional applications. Relevant test data are presented in Table 1.

TABLE 1

| Spec # | % HET | % PP | % LDPE | GAUGE | OTR | HAZE | MODULUS |
|---|---|---|---|---|---|---|---|
| I-1 | 80 | 10 | 10 | 76 | 463.2 | 3.2 | 80,000 |
| I-2 | 65 | 25 | 10 | 75 | 324.6 | 2.7 | 183,531 |
| I-3 | 70 | 20 | 10 | 77 | 345.6 | 2.7 | 150,361 |
| I-4 | 55 | 30 | 15 | 81 | 323.3 | 4.7 | 197,407 |
| I-5 | 65 | 20 | 15 | 67 | 418.5 | 3.6 | 162,573 |
| I-6 | 15 | 60 | 25 | 79 | 326.6 | 9.9 | 252,048 |
| I-7 | 25 | 50 | 25 | 76 | 347.0 | 8.4 | 217,053 |
| I-8 | 35 | 40 | 25 | 72 | 417.8 | 7.0 | 205,898 |
| I-9 | 45 | 30 | 25 | 70 | 478.7 | 6.4 | 166,556 |
| I-10 | 55 | 20 | 25 | 67 | 589.6 | 4.3 | 134,774 |

The data in the above Table illustrate the invention very well. Specimens I-6 and I-7, in which the percentage by weight of the olefin heteropolymer is within the broadest range of the invention, but lower than the most preferred lower limit of 30 weight percent, have haze percentages at the upper end of the acceptable range for institutional applications. Moreover, with respect to specimen I-6, the OTR is at the lower end of the acceptable range for institutional applications. It also should be noted that specimens I-6 and I-7 include a percentage by weight of polypropylene that is at the high end of the acceptable range, and actually is higher than the most preferred upper limit of 45 weight percent. Referring to specimen I-1, it should be noted that the inclusion of 80% by weight of the olefin heteropolymer and 10% by weight of the isotactic polypropylene results in the formation of a film having an undesirably low modulus.

EXAMPLE 2

In this example, the film includes the same polypropylene homopolymer and heteropolymer as in Example 1; however, the low density polyethylene was a metallocene polyethylene Exact 3132 from Exxon. Relevant data for these latter films are recorded in Table 2.

TABLE 2

| Spec # | % HET | % PP | % LDPE | GAUGE | OTR | HAZE | MODULUS |
|---|---|---|---|---|---|---|---|
| I-1 | 65 | 25 | 10 | 72 | 414.6 | 4.4 | 201,750 |
| I-2 | 70 | 20 | 10 | 79 | 413.0 | 4.8 | 166,165 |
| I-3 | 60 | 30 | 10 | 83 | 347.8 | 5.8 | 200,420 |

While the data collected for Example 2 does not include samples within the broad ranges of Example 1, the test results confirm that within the claimed ranges the required properties of this invention are obtained. Moreover, it should be noted that by using the metallocene polyethylene in place of the Chevron 1017 LDPE higher OTR and tensile modulus values were obtained for comparable product, with only a slight sacrifice in film clarity.

Without further elaboration, the foregoing will so fully illustrate my invention that others may, by applying current or future knowledge, readily adapt the same for use under various conditions of service.

What is claimed is:

1. A biaxially oriented film comprised of a polyolefin mixture consisting essentially of:
   a) more than about 10% by weight to about 60% by weight of isotactic polypropylene,
   b) about 10% by weight to about 25% by weight of low density polyethylene having a density no greater than about 0.935 g/cc and c) about 15% by weight to less than 80% by weight of an olefin heteropolymer containing propylene and at least one other α-olefin of 2 to 4 carbon atoms.

2. The biaxially oriented film according to claim 1 wherein said polyolefin mixture consists essentially of about 20% by weight to about 45% by weight of isotactic polypropylene; about 10% by weight to about 25% by weight of low density polyethylene having a density no greater than about 0.935 g/cc, and about 30% by weight to about 70% by weight of said olefin heteropolymer.

3. The biaxially oriented film according to claim 1 wherein said low density polyethylene is a metallocene catalyzed polyethylene.

4. The biaxially oriented film according to claim 1 wherein the polypropylene is a high crystalline polymer having an isotactic index of at least about 93%.

5. The biaxially oriented film according to claim 1 wherein the low density polyethylene has a density between about 0.915 g/cc and 0.935 g/cc.

6. The biaxially oriented film according to claim 1 wherein said olefin heteropolymer has a melting point less than that of polypropylene and a density no greater than about 0.95 g/cc, said film having an oxygen transmission rate of at least 325 cc/100 sq. in./day/atmosphere, a tensile modulus in excess of 80,000 psi and a haze value no greater than about 10%.

7. The biaxially oriented film according to claim 6 having a tensile modulus of no less than about 100,000 psi.

8. The biaxially oriented film according to claim 1 wherein said olefin heteropolymer is a propylene-ethylene copolymer.

9. The biaxially oriented film according to claim 1 wherein said film has opposed surfaces, further including a functional layer applied to one or both of said opposed surfaces.

10. The biaxially oriented film according to claim 1 wherein said film has opposed surfaces, further including a heat seal layer on at least one of said opposed surfaces.

11. The biaxially oriented film according to claim 1 wherein said film has opposed surfaces, further including a slip layer on at least one of said opposed surfaces.

12. The biaxially oriented film according to claim 1 wherein said film has an oxygen transmission rate of at least 325 cc/100 sq. in./day/atmosphere, a tensile modulus greater than 80,000 psi and a haze value no greater than about 10%.

13. The biaxially oriented film according to claim 12 having a tensile modulus of no less than about 100,000 psi.

14. The biaxially oriented film according to claim 1 wherein said film has a tensile modulus greater than 100,000 psi and a haze value less than 8%.

15. The biaxially oriented film according to claim 1 wherein said film has an oxygen transmission rate in excess of 400 cc/100 sq. in./day/atmosphere.

* * * * *